United States Patent [19]
van Liempd

[11] Patent Number: 5,304,455
[45] Date of Patent: Apr. 19, 1994

[54] MASTER DISC

[75] Inventor: Johannes P. J. G. van Liempd, Eindhoven, Netherlands

[73] Assignee: U.S. Philips Corporation, New York, N.Y.

[21] Appl. No.: 797,573

[22] Filed: Nov. 25, 1991

[30] Foreign Application Priority Data

Nov. 28, 1990 [NL] Netherlands ............... 9002594

[51] Int. Cl.$^5$ .................................. G11B 7/24
[52] U.S. Cl. ......................... 430/270; 430/495; 430/944; 430/945; 346/135.1; 369/288
[58] Field of Search ............. 430/270, 495, 945, 944, 430/911; 346/135.1; 369/288

[56] References Cited

U.S. PATENT DOCUMENTS

| | | | |
|---|---|---|---|
| 4,430,401 | 2/1984 | Wilinson | 430/8 |
| 4,508,811 | 4/1985 | Gravesteijn et al. | 430/270 |
| 4,944,967 | 7/1990 | Yabe et al. | 427/393.5 |
| 5,099,469 | 3/1992 | Dobbin et al. | 369/58 |
| 5,190,849 | 3/1993 | Santoh | 430/495 |

FOREIGN PATENT DOCUMENTS

| | | |
|---|---|---|
| 0022313 | 1/1981 | European Pat. Off. |
| 0116381 | 8/1984 | European Pat. Off. |
| 58-112792 | 7/1983 | Japan |
| 59-198191 | 11/1984 | Japan |
| 61-185487 | 8/1986 | Japan ............... 430/945 |
| 1-190494 | 7/1989 | Japan |
| 2109270 | 6/1983 | United Kingdom |

OTHER PUBLICATIONS

English language abstract of JP 01-190494, Fuji Photo Film KK, "Laser Beam Recording Material", Jul. 1989.
English language abstract of JP 59-198191, TDK Corp., "Optical Recording Medium", Nov. 1984.
English language abstract of JP 58-112792, Ricoh KK, "Light Information Recording Component", Jul. 1983.

Primary Examiner—Charles L. Bowers, Jr.
Assistant Examiner—John A. McPherson
Attorney, Agent, or Firm—Norman N. Spain

[57] ABSTRACT

A master disc for the manufacture of copies which in turn are used for the manufacture of further copies in the form of optically readable information carriers, the master disc comprising a substrate disc which is provided with an optical recording layer which comprises a nitrocellulose binder as well as a dye which is dissolved or finely dispersed in said binder, the dye being a squarylium dye which is used in a quantity of 1-15 wt. % of the binder.

6 Claims, 1 Drawing Sheet

MASTER DISC

FIELD OF THE INVENTION

The invention relates to a master disc for the manufacture of copies which in turn are used for the manufacture of further copies in the form of optically readable information carriers, said master disc comprising a substrate disc having an optical recording layer which comprises a nitrocellulose binder as well as a dye which is dissolved or finely dispersed in said binder.

BACKGROUND OF THE INVENTION

Such a master disc is known from German Offenlegungsschrift 32.37.236 which corresponds substantially to UK Patent Application GB 2,109,270.

The master disc forms the starting point in the manufacture of optically readable information carriers. It is the first disc in which optically readable information is stored by using laser light which is modulated in conformity with the information to be recorded. In the above master disc, irradiation with modulated laser light causes the recording layer to be heated in the exposed areas as a result of absorption of said light. The dye present in the layer facilitates the conversion of light into heat. The heating-up causes the nitrocellulose binder to decompose, so that a pit (bit) is formed in the exposed area. The discs is rotated during the exposure process, while the modulated laser light beam is moved diametrically across the plate, so that a spiral-shaped track of bits is formed.

The bits can be optically read immediately after they have been formed. Thus has the advantage that the quality and correctness of the inscribed bits can be checked immediately. Such a master disc is termed a direct-effect master disc.

The master disc which has been frequently used in practice up to now comprises a glass substrate to which a layer of a photoresist is applied. After exposure of the photoresist layer to a modulated laser light beam, the photoresist is treated with a developing liquid, so that, dependent on the type of photoresist used, the layer dissolves at the exposed or unexposed areas, thereby forming pits (information bits). This has the disadvantage that the quality of the inscribed information bits can only be checked after the disc has been developed. An advantage of the master disc on the basis of a photoresist is that the pits formed are very well defined and have an excellent signal-noise ratio when they are optically read.

A satisfactory pit definition is very important. It has to be taken into account that a copy is manufactured from a master disc, mostly a metal copy, which is termed father disc. One or more copies are manufactured from said father disc, the mother discs, which in turn is (are) used to manufacture matrices. Said matrices are used in an injection molding or compression molding process to manufacture a large number of optically readable synthetic resin information carriers such as Compact Discs or Laser Discs. This entire replica process is based on the basis product, the master disc, so that said disc has to meet stringent quality requirements. In this connection, it is noted that the dimensions of the bits on a Compact Disc must meet accurate standard requirements. For example, the width dimension of the bits must be approximately 0.5 $\mu$m. The distance between the turns of the spiral-shaped track is 1.6 $\mu$m. The length dimensions of the bits are representative of the information stored and, on using an EFM-modulation must vary, in discrete steps of 0.3 $\mu$m, between 0.9 and 3.6 $\mu$m. This means, that it must be possible to provide (inscribe) and optically distinguish bits having length dimensions of 0.9; 1.2; 1.5; 1.8; 2.1; 2.4; 2.7; 3.0; 3.3 and 3.6 $\mu$m.

The shape of the pit (bit definition), the signal-noise ratio when the bits are read and, in particular, the so-called block-error rate, which is a measure of the number of master-read errors, are important factors in the manufacture and use of the master.

The above-mentioned direct effect master based on a recording layer of nitrocellulose which comprises a dye, has the disadvantage that the shape of the pit obtained is not optimal and substantially less satisfactorily defined than the shape of the pit in a photoresist master. This means that the signal-noise ratio is unsatisfactory and that the block-error rate is increased. A further problem is that due to the decomposition of nitrocellulose and dye in the exposed areas, the reaction products formed in said process deposit on the surface of the master disc. This deposited residue is termed debris and causes a deterioration of the quality of the master disc.

The latter problem is mentioned as such in the above Offenlegungsschrift 32.37.236. According to said literature reference, better results are obtained when a binder of cellulose nitrate is used which is formed from a cellulose starting material comprising at least 97% of alpha cellulose.

SUMMARY OF THE INVENTION

It has been found that the use of a special dye in a nitrocellulose binder results in an important improvement of the master disc, the block-error rate being improved, in particular, as a result of an improved pit shape and a reduction in debris.

The invention more particularly relates to a master disc for the manufacturer of further copies in the form of optically readable information carriers the master comprising a substrate disc having an optical recording layer which comprises a nitrocellulose binder, and a dye dissolved or dispersed in said binder which is characterized in that the nitrocellulose binder comprises a squarylium dye in a quantity of 1-15 wt. % of the binder.

In a preferred embodiment, the recording layer has a thickness of 200±30 nm.

In addition to the above improvement, the use of a squarylium dye in accordance with the invention has the advantage that the master disc can be inscribed by means of a semiconductor laser having an emission wavelength of 800-840 nm. In comparison with the argon gas laser used in the above-mentioned Offenlegungsschrift ($\lambda$=450–490 nm), such an infrared semiconductor laser has small dimensions and is cheap. Consequently, the infrared semiconductor can be easily and advantageously incorporated in a compact recording device.

At an equal numerical aperture (NA) of the focusing-lens system, the infrared semiconductor laser fundamentally has a large laser spot than an argon laser. It has been found that bits can nevertheless be very accurately formed in the recording layer of the master, said bits having a width dimension of 0.5 $\mu$m and length dimensions 0.9 to 3.6 $\mu$m as described in detail hereinabove.

A squarylium dye used in the master disc according to the invention is well known per se and is defined by the general formula

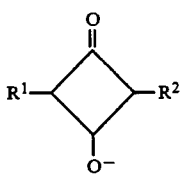
(1)

where $R^1$ and $R^2$ are both equal or different and represent an organic radical.

Examples of organic radical groups $R^1$ and $R^2$ are substituted aromatic groups such as, in particular, a substituted phenyl group and substituted aromatic-aliphatic groups such as a substituted phenyl-alkyl group or a substituted heterocyclic-alkyl group, for example a substituted pyrylium-alkyl group or thiopyrylium-alkyl group.

Suitable squarylium dyes are described in, inter alia, European Patent Specification 116381 in the name of Applicants which corresponds to U.S. Pat. No. 4,508,811.

Preferred results are attained, in particular, when squarylium dyes are used which correspond to one of the following structural formulae.

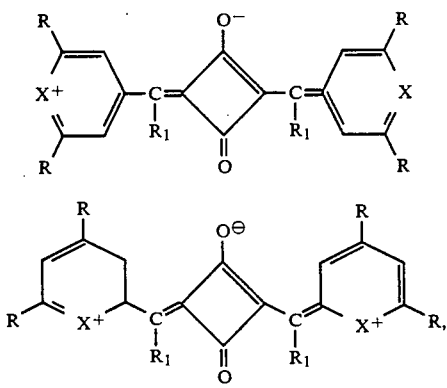

where
X is a oxygen atom or a sulphur atom,
$R_1$ is a hydrogen atom or a methyl group, and
R is a hydrocarbon radical selected from the group consisting of alkyl or cyclo-alkyl having 1-12 C-atoms, aryl, aralkyl and alkaryl having 5-12 carbon atoms.

The concentration of the squarylium dye in accordance with formula (2) or (3) in the cellulose binder is preferably 2-8 wt. %.

Very suitable results are attained when squarylium substances of the above formulae are used, where
$R_1$ is a hydrogen atom, and
R is an alkyl group.

This applies, in particular, to squarylium substances, where R represents a tertiary alkyl group such as a tertiary butyl group.

The squarylium dye in accordance with the structural formula (2) or (3), where X is a sulphur atom, $R_1$ is a hydrogen atom and R is a tertiary butyl group, will be termed SQS hereinafter.

As mentioned above, it is known to use a recording layer in a master disc, which recording layer comprises a special type of nitrocellulose and a dye dissolved therein, which dye absorbs in the visible range of the spectrum, for example from 440-530 nm (See, for example, DT-OS 3237236, page 19, last paragraph). The recording process is carried out with an argon gas laser.

In comparison with the use of a visible-light absorbing dye, such as the frequently used Amaplast Scarlet MM°, the use of the squarylium dyes in accordance with the invention, such as the dye SQS (4-[[3-[[2,6-bis(1,1-dimethylethyl)-4H-thiopyrone-4-ylidene]methyl-2,6-bis(1.1-dimethylethyl)thiopyrylium) has the advantage of a substantially higher absorption.

For example, the penetration depth of laser light ($\lambda=830$ nm) in SQS is 150 nm and of laser light ($\lambda=480$ nm) in Amaplast Scarlet MM is 750 nm. The penetration depth is the distance over which the intensity of the laser light has decreased by a factor of $3^{-1}$. The use of SQS in a master disc consequently results in a strongly improved sensitivity.

Further it has been found that the use of a squarylium dye results in a strong improvement of the so-called BLER factor. The BLER (block error rate) factor indicates the number of wrong information blocks which are read per second. The reading rate is 1.2-1.4 m/sec. The maximum number of information blocks per second is 7350. It has been found that when a squarylium dye is used, a BLER factor $\leqq 20$ is obtained for the entire surface of the master. When the known Amaplast Scarlet MM is used the BLER factor is 100-200, with peaks of 400, for the entire surface of the master. The cause of said substantial and surprising improvement when using a squarylium dye is not known to Applicants. Presumably, the above-mentioned grater sensitivity results in a reduction of the debris. Debris is to be understood to mean herein residual material deposited on the surface of the master as a result of the formation of information bits (pits in the nitrocellulose-dye recording layer).

Further, Applicants have surprisingly found that in the master disc according to the invention, the push-pull signal is significantly improved. The push-pull signal is the desired amplitude of the tracking signal with which the information track can be read.

In the case of Compact Discs which are ultimately manufactured by means of the master disc according to the invention, the push-pull signal must vary between 0.04 and 0.07. When the master disc according to the invention is used, a push-pull signal of 0.06 is attained. When a master disc is used which comprises a dye which absorbs in the visible range of the spectrum, in particular the dye Amaplast Scarlet MM, a push-pull signal of 0.035 to 0.04 is attained. Consequently, this signal coincides with one limiting value or is even below said limiting value. Also in this case, the cause of the improved push-pull signal is unknown to Applicants. It is presumed that the improved geometry of the pits in the master disc according to the invention brings about the improved push-pull signal. More in particular, it is presumed that the lower rim brings about said improvement. The rim is the edge formed around the information pit during the recording process.

The substrate disc is preferably manufactured from glass but may alternatively be manufactured from synthetic resin such as polycarbonate or polymethylmethacrylate. To accurately guide the laser light over the surface of the master disc during the recording or reading process, the substrate plate may be provided with a follower track, for example in the form of a spiral-shaped groove. In the case of a synthetic resin substrate disc, the groove is formed, preferably, during the manufacture of said plate in an injection or compression molding process. For this purpose, the mold used in the injection molding process or compression molding process, is provided with a matrix the surface of which comprises a ridge-shaped track which is the negative of the desired follower track. In the case of a glass substrate disc, the surface is provided with a layer of a light or heat-cured lacquer in which the follower track is provided. For this purpose, a liquid, light or heat-curable lacquer is provided between a matrix, the surface of which has a ridge-shaped track which is the negative of the desired follower track, and the glass substrate disc. The lacquer is cured and the substrate disc with the cured lacquer layer is removed from the matrix.

The recording layer is provided on the substrate disc by means of a spin coating process. To this end, a solution of the nitrocellulose binder and the squarylium dye in a suitable organic solvent is produced. For example in ethoxy ethyl acetate. The solution contains a combined quantity of 2-4 wt. % of the nitrocellulose binder and the dye. The solution is provided on the substrate which is rotated at a speed of 400-500 Hz. During the rotation, the entire surface of the substrate disc is covered with a thin layer of nitrocellulose and dye, while simultaneously evaporating the solvent. If desired, a heat treatment can subsequently be carried out to remove any residual solvent.

As described above, the recording layer is rotated during the recording process and exposed to a laser light beam issuing from an infrared semiconductor laser ($\lambda = 830$ nm) which is moved diametrally across the surface of the recording layer. The laser light beam is modulated in conformity with the information to be recorded. The laser light beam is focused to the surface of the recording layer by means of an objective having the desired aperture. The laser spot shown on said surface is, for example, elliptically shaped and has dimensions of, for example, $0.6 \times 0.4$ μm.

In the exposed areas of the recording layer information bits are formed in the form of pits. The correctness and quality of the recorded information bits can be checked immediately by means of a read laser light beam. Said read beam may be issuing from an infrared semiconductor laser which in comparison with the write laser has substantially less power, for example a factor of 10 less, so that during reading no change takes place in the recording layer. Preferably, a He-Ne laser is used for reading. The read laser light beam is a continuous beam which is focused to the recording layer. The read spot is located behind the write spot at a distance of 5-30 μm. Reading takes place on the basis of reflection differences.

BRIEF DESCRIPTION OF THE DRAWINGS

The invention will be explained in greater detail by means of the exemplary embodiment and the accompanying drawing, in which.

DETAILED DESCRIPTION OF THE PREFERRED EMBODIMENTS

Figure 1:
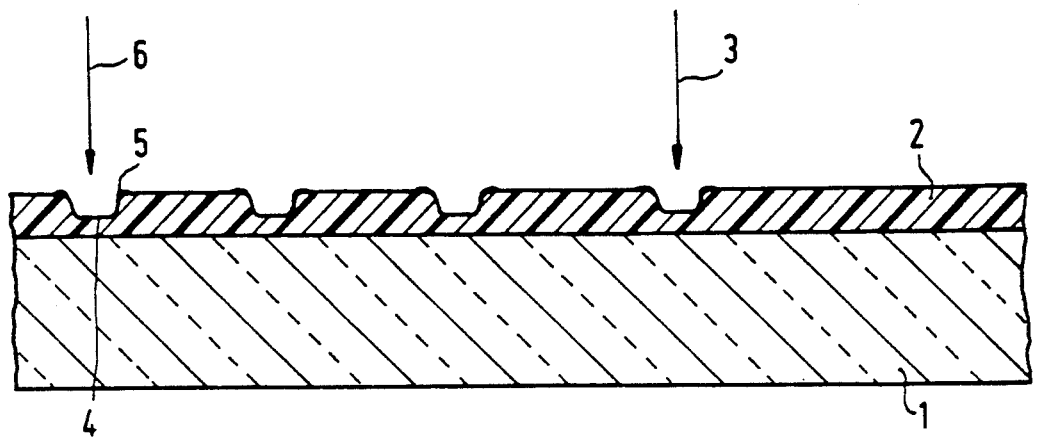
FIG. 1 is a cross-sectional view of a master disc according to the invention.

In FIG. 1, reference numeral 1 denotes a glass, disc-shaped substrate plate having a diameter of 240 nm and a thickness of 5 mm. On said substrate disc 1 there is provided a recording layer 2 of nitrocellulose in which 5 wt. % of SQS is dissolved or finely dispersed. The layer 2 is obtained by first dissolving a mixture of 95 wt. % of nitrocellulose (Hercules RS 5-6) (T.M) and 5 wt. % of SQS in ethoxy ethyl acetate. The solution is poured onto the central part of the surface of the substrate disc 1. The substrate disc is attached to a rotary platform. After the solution has been provided on the substrate disc, the latter is rotated by means of said rotary platform (not shown) at a speed of 400-500 Hz. As a result of said rotary movement, the solution is spread over the entire surface of the substrate. At the same time evaporation of the solvent takes place. The final result is a layer 2 having a uniform thickness of 200 nm ($\pm 30$ nm). Layer 2 is exposed to laser light the direction indicated by arrow 3. The laser light beam is pulsated (modulated) in conformity with the information to be recorded, the EFM (eight out of fourteen) modulation system being used. The modulation system also forms the basis of CDs (compact discs). The laser light beam according to arrow 3 issues from a semiconductor laser of the SHARP LT 015 MD-type having an emission wavelength of 830 nm. The laser has a power of 2.5 mW on the disc (more in general 1.5-4 mW). The laser light beam is focused to layer 2 by means of an objective (not shown) having a numerical aperture of $0.6 \times 0.4$. As a result thereof, the write spot (diameter of the beam on the surface of layer 2) has an elliptical shape. It is alternatively possible to use an objective having a numerical aperture of 0.5, in which case a circular read spot is obtained. As a result of exposure to the modulated laser light beam, information pits (bits) 4 are formed in layer 2. Said pits are formed because in the exposed areas the laser light energy is absorbed by a dye SQS and converted into heat. The temperature rises, thereby causing the nitrocellulose binder to chemically decompose. The decomposition reaction is exothermal so that additional energy is released. The decomposition may even take place in an explosive manner due to the nature of the nitro-cellulose binder. During the recording process, the master disc is rotated while the laser light beam 3 is moved diametrally across the surface of the disc. In this manner, a spiral-shaped track (also see FIG. 2) of information bits is obtained, the distance between the turns of the track being 1.6 μm.

The width dimension of the pits is 0.5 μm. The length dimension of the pits differs in conformity with the recorded information. The length dimensions vary, in discrete steps of 0.3 μm, between 0.9 μm and 3.6 μm. The depth of the pits is from 0.1-0.2 μm and depends on the wavelength of the read laser light in accordance with the formula $d = \lambda/4n$, where d denotes the depth, $\lambda$ the wavelength of the read laser light and n the refractive index.

The information pits 4 are provided with a rim 5. A noticeable feature is the fact that the height of the rim 5 is small in comparison with the above-mentioned known recording element in which a recording layer of nitrocellulose is used in which a dye is dispersed and which absorbs in the visible range of the spectrum, such as Amaplast Scarlet MM.

The recorded information can be read immediately after the write process and its correctness checked. For this purpose, a read laser light beam 6 is used which is located at a distance of 5-30 μm behind the write beam 3. Said laser light beam 6 issues from a He-Ne laser having an emission wavelength of approximately 633 nm. It is alternatively possible to use an Ar laser having an emission wavelength of 459 nm. As in the write process, the master disc is rotated during reading. The reading speed is 1.2-1.4 m/sec. As noted before, during reading a BLER factor (block error rate) having an average value of ≦20 is measured. The push-pull signal has a value of 0.06. When using a 200 nm thick recording layer of nitrocellulose binder in which the dye Amaplast Scarlet MM is dissolved, a BLER factor of 100-200 is measured and a push-pull signal of 0.035-0.04. It is a further noted that the latter recording layer is relatively insensitive, so that an argon laser having a power of 7.5 mW (on the disc) was used for the write process.

Figure 2:
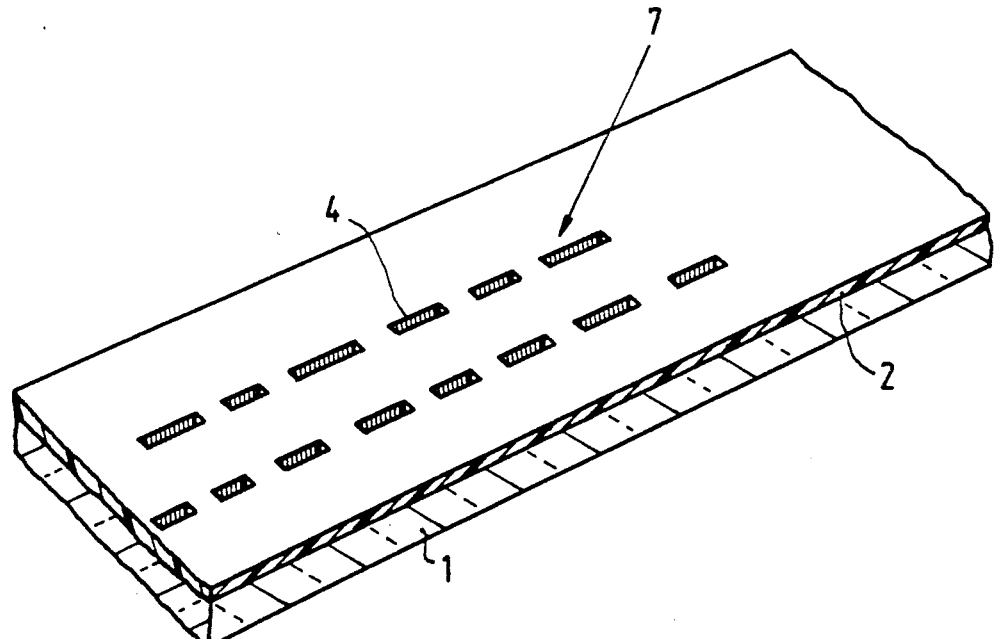
FIG. 2 is a top view of the master disc.

In FIG. 2, corresponding parts bear the same reference numerals as in FIG. 1. The information bits 4 have the same width dimension, i.e. 0.5 μm, and different length dimensions of 0.9-3.6 μm. The bits are arranged in an information track 7.

I claim:

1. A master disc for the manufacture of copies which in turn are used for the manufacture of further copies in the form of optically readable information carriers, said master disc comprising a substrate disc having an optical recording layer which comprises a nitrocellulose binder as well as a dye which is dissolved or finely dispersed in said binder, characterized in that the dye is a squarylium dye in a quantity of 1-15 wt. % of the binder and the squarylium dye corresponds to formula (2)

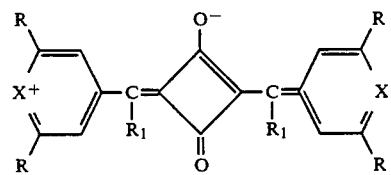

(2)

or to formula (3)

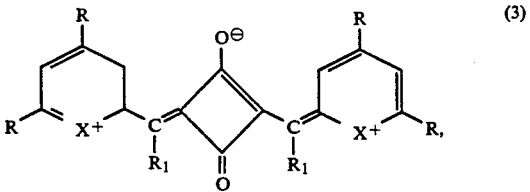

(3)

where
X is an oxygen or sulpher atom,
$R_1$ is a hydrogen atom, and
R is an alkyl group.

2. A master disc as claimed in claim 1, characterized in that the optical recording layer has a thickness of 300±30 nm.

3. A master disc as claimed in claim 1 characterized in that during the writing of information in the recording layer by exposure to a laser light beam which is modulated in conformity with the information and which issues from a semiconductor laser having an emission wavelength of 800-840 nm, information pits representing bits are formed in the recording layer, said pits exhibiting an improved geometry and, in particular, a lower edge portion and, in addition, reduction of the production of noise.

4. A master disc as claimed in claim 2 characterized in that during the writing of information in the recording layer by exposure to a laser light beam which is modulated in conformity with the information and which issues from a semiconductor laser having an emission wavelength of 800-840 nm, pits representing information bis are formed in the recording layer, said pits exhibiting an improved geometry and, in particular, a lower edge portion and, in addition, the production of noise being reduced.

5. The master disc as claimed in claim 1 wherein the dye is present in a quantity of 2-8 wt. % or the nitrocellulose binder.

6. A master disc as claimed in claim 5 characterized in that during the writing of information in the recording layer by exposure to a laser light beam which is modulated in conformity with the information and which issues from a semiconductor laser having an emission wavelength of 800-840 nm, pits representing information bits are formed in the recording layer, said pits exhibiting an improved geometry and, in particular, a lower edge portion (rim) and, in addition, the production of noise being reduced.

* * * * *